US009293142B2

(12) United States Patent
Suzuki (10) Patent No.: US 9,293,142 B2
(45) Date of Patent: Mar. 22, 2016

(54) VOICE RECOGNITION SYSTEM (71) Applicant: DENSO CORPORATION, Kariya, Aichi-pref. (JP)

(72) Inventor: Ryuichi Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/430,712

(22) PCT Filed: Sep. 2, 2013

(86) PCT No.: PCT/JP2013/005165
§ 371 (c)(1),
(2) Date: Mar. 24, 2015

(87) PCT Pub. No.: WO2014/054217
PCT Pub. Date: Apr. 10, 2014

(65) Prior Publication Data
US 2015/0221308 A1  Aug. 6, 2015

(30) Foreign Application Priority Data

Oct. 2, 2012  (JP) .................................. 2012-220298

(51) Int. Cl.
*G10L 17/22* (2013.01)
*G10L 15/32* (2013.01)
*G01C 21/36* (2006.01)
*B60R 16/037* (2006.01)
*G10L 15/08* (2006.01)
*G10L 15/22* (2006.01)

(52) U.S. Cl.
CPC ............ *G10L 17/22* (2013.01); *G01C 21/3608* (2013.01); *G10L 15/32* (2013.01); *B60R 16/0373* (2013.01); *G10L 15/08* (2013.01); *G10L 2015/223* (2013.01)

(58) Field of Classification Search
CPC .......... G10L 17/22; G10L 15/32; G10L 15/08; B60R 16/0373; G01C 21/3608
USPC ......................................................... 701/539
See application file for complete search history.

(56) References Cited

U.S. PATENT DOCUMENTS

| 6,112,174 A * | 8/2000 | Wakisaka ........... G01C 21/3608 701/117 |
| 2011/0131037 A1* | 6/2011 | Huang ................ B60R 16/0373 704/10 |
| 2011/0131040 A1* | 6/2011 | Huang ................ B60R 16/0373 704/231 |

FOREIGN PATENT DOCUMENTS

| JP | 2002-182679 A | 6/2002 |
| JP | 2004-272134 A | 9/2004 |

(Continued)

OTHER PUBLICATIONS

International Search Report and Written Opinion of the International Searching Authority mailed Dec. 3, 2013 for the corresponding international application No. PCT/JP2013/005165 (and English translation).

*Primary Examiner* — Richard Camby
(74) *Attorney, Agent, or Firm* — Posz Law Group, PLC (57) ABSTRACT

A vehicular speech recognition system including multiple speech recognition apparatuses and a speech recognition controller is provided. The multiple speech recognition apparatuses are mounted to a vehicle. When speech recognition of an inputted speech is performed individually by the multiple speech recognition apparatuses to provide multiple results of the speech recognition, the speech recognition controller selects and adopts one result of the speech recognition from among the multiple results of the speech recognition based on contents of the multiple results of the speech recognition.

5 Claims, 4 Drawing Sheets

(56) References Cited

FOREIGN PATENT DOCUMENTS

| | | |
|---|---|---|
| JP | 2005-003997 A | 1/2005 |
| JP | 2005-266192 A | 9/2005 |
| JP | 2009-198560 A | 9/2009 |
| JP | 2010-055020 A | 3/2010 |
| JP | 2010-091675 A | 4/2010 |
| JP | 2011-227129 A | 11/2011 |

* cited by examiner

| DCU SPEECH RECOG RSLT | NAVI SPEECH RECOG RSLT | SYSTEM OPERATION |
|---|---|---|
| HIERARCHY COMMAND | | ADOPT DCU RECOG RSLT |
| HIERARCHY COMMAND (NAVI COMMAND IN SPEECH RECOG) | | ADOPT DCU RECOG RSLT DO SPEECH RECOG IN NAVI FROM NOW |
| 1-SHOT TYPE COMMAND | 1-SHOT TYPE COMMAND (1-SHOT COMMAND DIFFERENT THAN DUC) | ADOPT DCU RECOG RSLT DO SPEECH RECOG IN NAVI FROM NOW |
| 1-SHOT TYPE COMMAND | 1-SHOT TYPE COMMAND (SAME 1-SHOT COMMAND AS DUC) | ADOPT NAVI RECOG RSLT DO SPEECH RECOG IN NAVI FROM NOW |

VOICE RECOGNITION SYSTEM

CROSS-REFERENCE TO RELATED APPLICATIONS

The present disclosure is a U.S. national stage application of PCT/JP2013/005165 filed on Sep. 2, 2013 and is based on Japanese Patent Application No. 2012-220298 filed on Oct. 2, 2012, the contents of which are incorporated herein by reference.

TECHNICAL FIELD

The present disclosure relates to a speech recognition system including multiple speech recognition apparatuses.

BACKGROUND ART

A known system described in Patent Literature 1 is configured to perform speech recognition using multiple speech recognition apparatuses. This system includes multiple speech recognition apparatuses that perform speech recognition of multiple speech recognition target files in parallel.

PRIOR ART LITERATURES

Patent Literature

Patent Literature 1: JP 2009-198560A

SUMMARY OF INVENTION

The above conventional configuration is suitable for speech recognition of huge speech files in a short amount of time because the speech recognition of multiple speech files is performed in parallel. However, the presence of multiple speech recognition apparatuses does not improve speech recognition accuracy.

It is therefore object of the present disclosure to provide a speech recognition system that includes multiple speech recognition apparatuses and that can improve speech recognition accuracy.

According to a first example of the present disclosure, a vehicular speech recognition system comprises: plurality of speech recognition apparatuses that are mounted to a vehicle; and a speech recognition controller that, when speech recognition of an inputted speech is performed individually by the plurality of speech recognition apparatuses to provide a plurality of results of the speech recognition, selects and adopts one result of the speech recognition from among the plurality of results of the speech recognition based on contents of the plurality of results of the speech recognition. Therefore, the vehicular speech recognition system can improve speech recognition accuracy.

According to a second example of the present disclosure, a vehicular speech recognition system comprises: a display control unit that is mounted to a vehicle and includes a speech recognition apparatus; a navigation unit that is mounted to the vehicle, is connected to the display control unit, and includes a speech recognition apparatus; and a speech recognition controller that, when speech recognition of an inputted speech is performed individually by the two speech recognition apparatus, selects and adopts one result of the speech recognition from among results of the speech recognition of the two speech recognition apparatuses based on contents of the result of the speech recognition of the two speech recognition apparatuses. Therefore, the vehicular speech recognition system can improve speech recognition accuracy.

BRIEF DESCRIPTION OF DRAWINGS

The above and other objects, features and advantages of the present disclosure will become more apparent from the following detailed description made with reference to the accompanying drawings. In the accompanying drawings.

EMBODIMENTS FOR CARRYING OUT INVENTION

Figure 1:
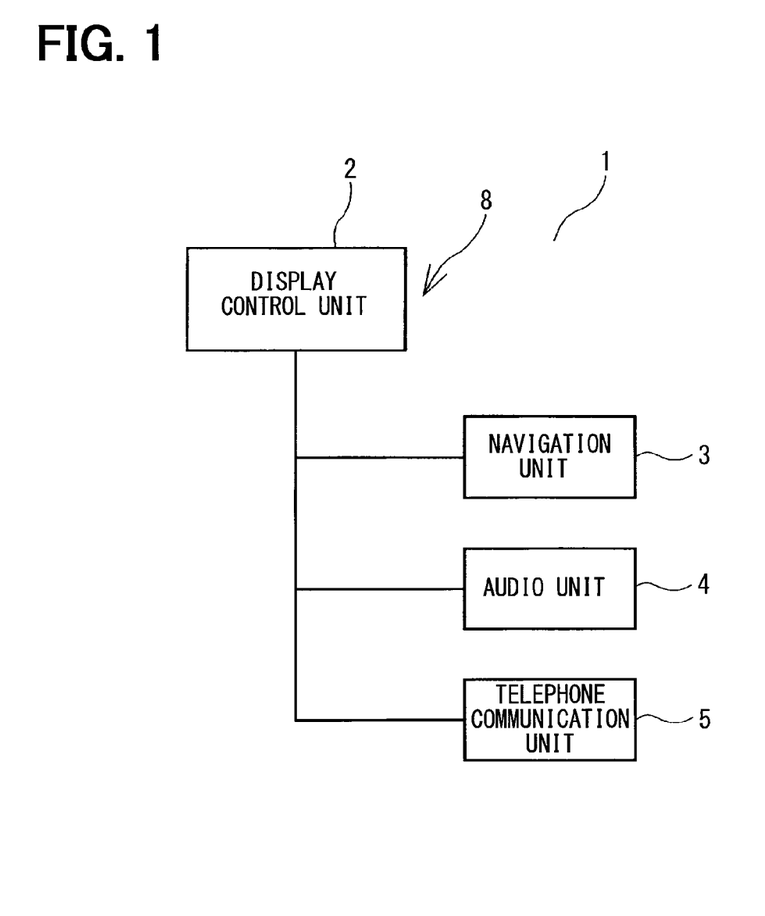
FIG. 1 is a block diagram illustrating an in-vehicle system according to a first embodiment of the present disclosure.

An in-vehicle system mounted to a vehicle according to a first embodiment of the present disclosure will be described with reference to FIG. 1 to FIG. 4. FIG. 1 is a block diagram schematically illustrating an electric configuration of the in-vehicle system 1 of the present embodiment.

As shown in FIG. 1, the in-vehicle system 1 includes a display control unit (also called DCU hereinafter) 2, a navigation unit 3, an audio unit 4, and a telephone communication unit 5. The DCU2 and the navigation unit 3, respectively, include build-in speech recognition apparatuses 6 and 7 (refer to FIG. 2). These DCU 2 and navigation unit 3 are components of the speech recognition system 8.

Figure 2:
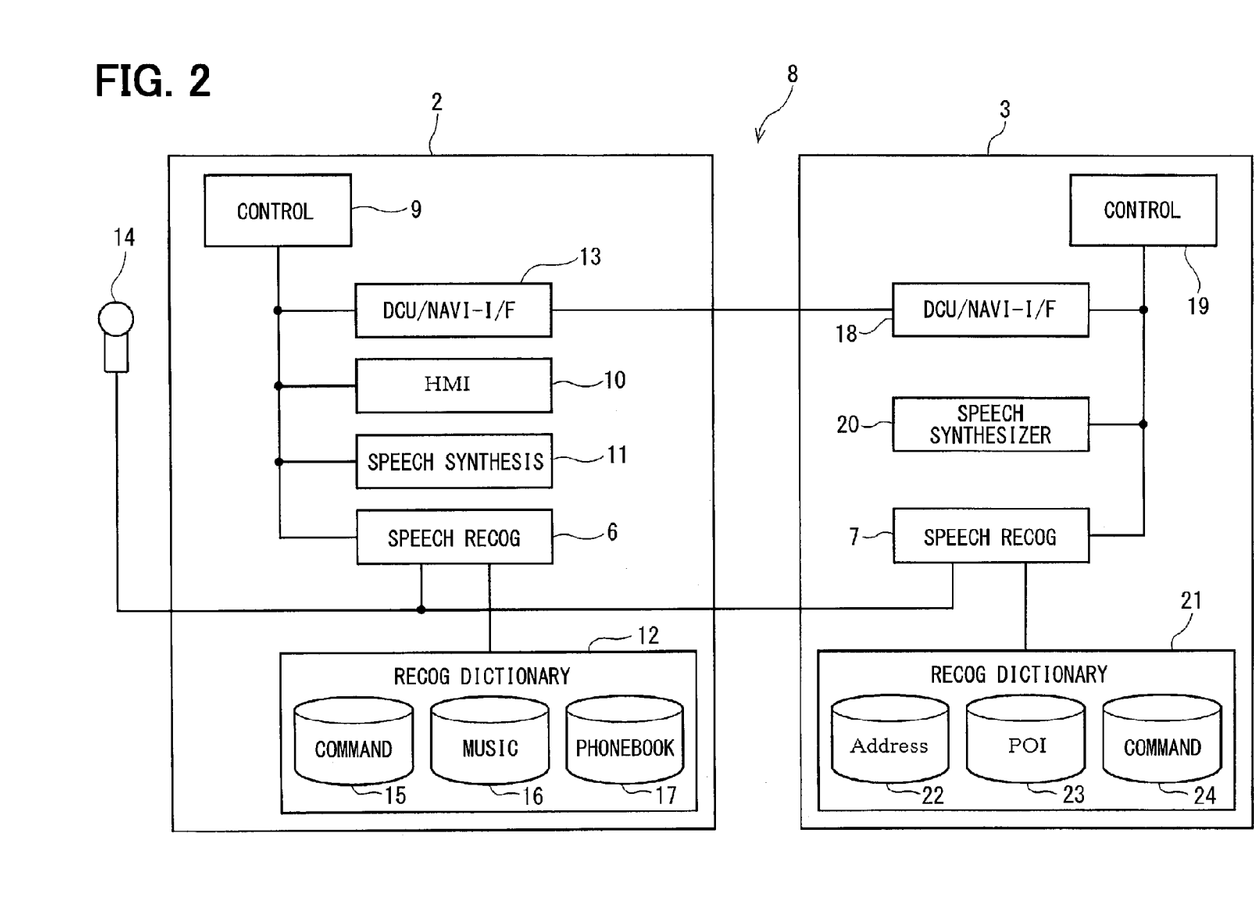
FIG. 2 is a block diagram illustrating a display control unit and a navigation unit.

As shown in FIG. 2, the DCU 2 includes a controller 9 (an example of speech recognition controller or means), a human machine interface 10 (also called HMI hereinafter), a speech synthesizer 11 (TTS section) 11, a speech recognition apparatus 6 (VR section), a recognition dictionary 12, and a DCU-Navi I/F 13. The controller 9 has a function to controls each part of DCU 2. The HMI 10 includes a display, an operation part, and a remote control. The operation part includes a touch panel provided on a screen of the display and multiple operation switches provided on a periphery of the screen of the display.

The speech synthesizer 11 has a function to convert (synthesize) a text, which is from the controller 9, into speech (speech signal). The synthesized speech is outputted to the controller 9. The synthesized speech is sent from the controller 9 to the audio unit 4 and is outputted as speech via a speaker of the audio unit 4.

The speech recognition apparatus 6 has a function to use each dictionary of the recognition dictionary 12 to perform speech recognition of speech (analog speech signal) that is inputted via a microphone 14 (analog speech signal). A recognition result is outputted to the controller 9. The recognition dictionary 12 includes a command-usage dictionary 15, a music-usage dictionary 16, and a telephone-phone-usage dictionary 17. The command-usage dictionary 15, the music-usage dictionary 16 and the telephone-phone-usage dictionary 17, respectively, are speech recognition dictionaries corresponding to three data fields, which are commands (various commands for the DCU 2, the navigation unit 3, the audio unit 4 and the telephone communication unit 5), music, and telephone. The recognition dictionary 12 may further include one or more speech recognition dictionaries corresponding to one or more data fields other than the above-described three data fields.

The controller 9 performs data communications with the navigation unit 3 via the DCU-Navi I/F 13, and the DCU-Navi I/F 18 of the navigation unit 3. The DCU 2 includes an I/F (not shown) for performing data communications with the DUC 2 and the audio unit 4 or with the telephone communication unit 5.

As shown in FIG. 2, the navigation unit 3 includes a controller 19, a speech synthesizer 20 (TTS section), a speech recognition apparatus 7 (VR section), a recognition dictionary 21, and a DCU-Navi I/F 18. Furthermore, the navigation unit 3 includes typical configurations of a navigation apparatus, i.e., includes a position detection device for detecting present position of the vehicle, a map data input device for inputting map data and the like, a route calculation device for calculating a route from the present position to a destination, and a route guidance device for performing guidance along the route (each device not shown).

The controller 19 has a function to control each part of the navigation unit 3. The speech synthesizer 20 has a function to convert (synthesize) a text, which is from the controller 19, into speech (sound signal). The synthesized speech is outputted to the controller 19. The synthesized speech is sent from the controller 19 to the DCU 2 and is outputted as speech via a speaker of the audio unit 4.

The speech recognition apparatus 7 receives through the DCU 2 the speech (analog voice signal) that is inputted via the microphone 14. The speech recognition apparatus 7 has a function to perform speech recognition of this inputted speech using each dictionary of the recognition dictionary 21. A speech recognition result is outputted to the controller 19. The recognition dictionary 21 includes an Address-usage dictionary 22, a POI (point of interest) usage dictionary 23, and a command usage dictionary 24. The Address-usage dictionary 22, the POI (point of interest) usage dictionary 23, and the command usage dictionary 24, respectively, are speech recognition dictionaries corresponding to three data fields, which are addresses, POIs (facility names), and commands (various commands for the navigation unit 3). The recognition dictionary 21 may further include one or more speech recognition dictionaries corresponding to one or more data fields other than the above-described three data fields.

The controller 19 performs data communications with the DCU 2 via the DCU-Navi I/F 18 and the DCU-Navi I/F 13 of the DCU 2.

The navigation unit 3 in the present embodiment includes some configurations of a typical navigation apparatus but does not include a particular configuration of the typical navigation apparatus. The particular configuration is a HMI including a display, a touch panel, an operation unit and a remote control. The navigation unit 3 can utilize the DCU 2 as the HMI of the navigation unit 3.

In this configuration, when the DCU 2 is used as the HMI of the navigation unit 3, a control subject (master control subject) transitions to the navigation unit 3 and the navigation unit 3 controls the DCU 2 (salve control subject). Thereafter, when the navigation unit 3 ends operations (navigation process), the master control subject returns to the DCU 2 and the DCU 2 controls the navigation unit 3 (salve control subject). It is noted that in response to power on the vehicle (in the case of an initial state or normal state), the DCU 2 is the subject controller, so that the DCU 2 controls the navigation unit 3 (salve control subject).

In a situation where the audio unit 4 is connected to the DCU 2, the DCU 2 operates as the HMI of the audio unit 4. Specifically, when a user inputs a name of music by operating the touch panel of the DCU 2 or inputting the speech via the microphone 14, the DCU 2 transmits an instruction to reproduce the music having this name to the audio unit 4. In response to this instruction, the audio unit 4 reproduces the music. In the above case, the DCU 2 is the master control subject, so that the DCU 2 controls the audio unit 4 (salve control subject).

In a situation where the telephone communication unit 5 is connected to the DCU 2, the DCU 2 operates as the HMI of the telephone communication unit 5. Specifically, when a user inputs a telephone number (or name of a person to whom a call is to be made) by operating the touch panel of the DCU 2 or inputting the speech via the microphone 14, the DCU 2 transmits an instruction to call the telephone number (make a call) to the telephone communication unit 5. In response to the instruction, the telephone communication unit 5 calls the telephone number. In this case, the DCU 2 is the master control subject, so that the DCU 2 controls the telephone communication unit 5 (salve control subject). When a call is made via the telephone communication unit 5, the microphone 14 of the DCU 2 serves as a microphone for the call and the speaker of the audio unit 4 servers as a speaker for the call. When the telephone communication unit 5 receives an incoming call, an incoming call signal is sent to the DCU 2. Then, in response to the incoming call, the DCU 2 informs the user of the incoming call. When the user selects start of telephone communications, the DCU 2 transmits an instruction to start the telephone communications to the telephone communication unit 5, so as to start the telephone communications.

Figure 3:
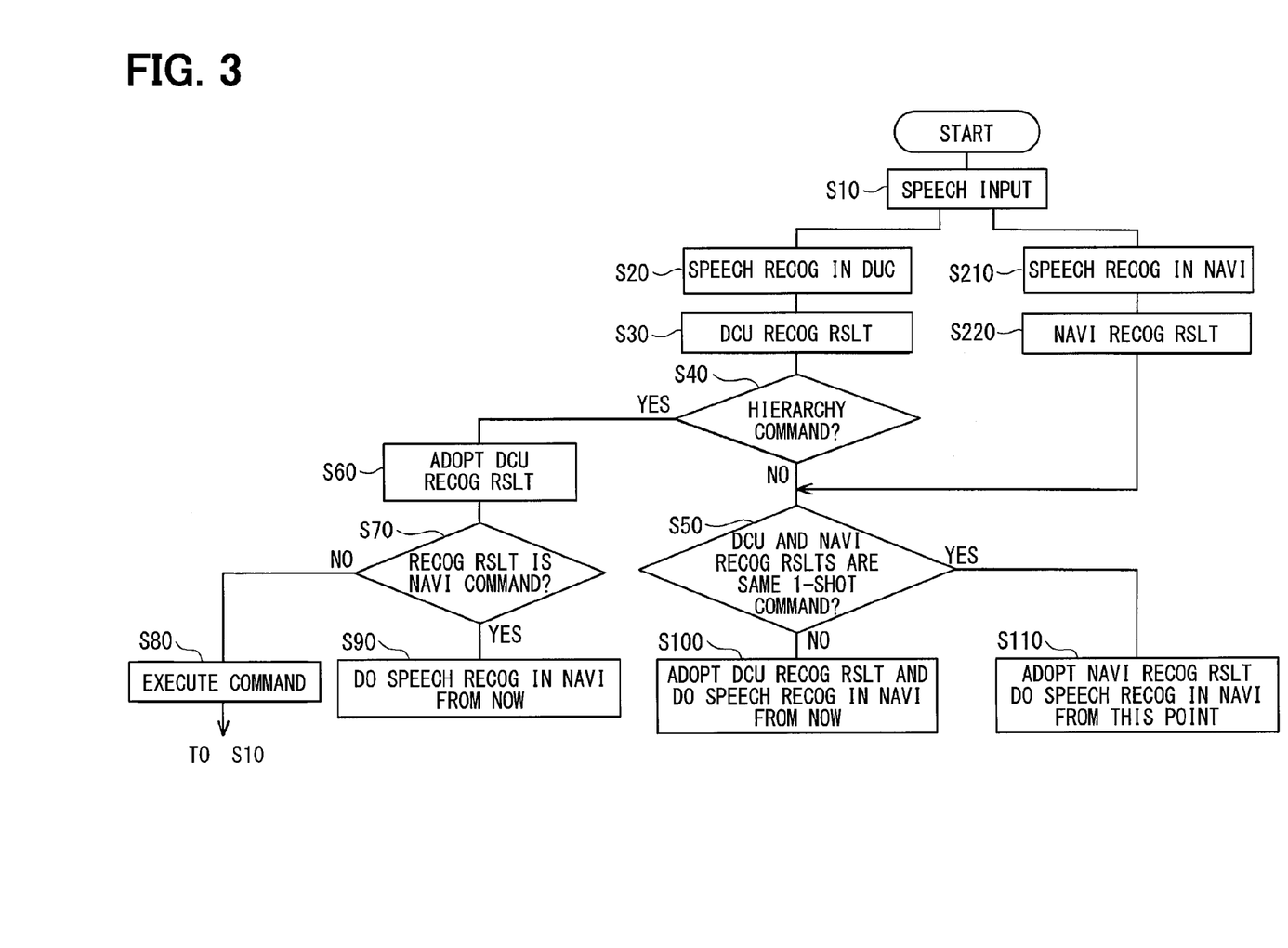
FIG. 3 is a flow chart illustrating speech recognition control.

Next, with reference to the flow chart of FIG. 3, explanation is given on operations of the speech recognition system 8 (the controller 9 and the speech recognition apparatus 6 of the DCU 2, and the controller 19 and the speech recognition apparatus 7 of the navigation unit 3).

When the speech recognition is started, the speech uttered by the user is inputted via the microphone 14 at S10. At subsequent S20 and S210, the speech recognition of the inputted speech is performed by the speech recognition apparatus 6 of the DCU 2 and the speech recognition apparatus 7 of the navigation unit 3 in parallel (in concurrence and in parallel).

After S20, the process proceeds to S30. At S30, a result of the speech recognition by the speech recognition apparatus 6 of the DCU 2 is provided to the controller 9 of the DCU 2. After S210, the process proceeds to S220. At S220, a result of the speech recognition by the speech recognition apparatus 7 of the navigation unit 3 is provided to the controller 19 of the navigation unit 3.

After S30, the process proceeds to S40. At S40, the controller 9 of the DCU 2 determines whether or not the result of the speech recognition by the speech recognition apparatus 6 of the DCU 2 is a hierarchy command (a command that is any one of various commands of the DCU 2, the navigation unit 3, the audio unit 4 or the telephone communication unit 5 and that does not have a speech corresponding to data portion). When the result of the speech recognition by the speech recognition apparatus 6 of the DCU 2 is a hierarchy command, the process proceeds to S60 according to "YES" at S40. At S60, the controller 9 of the DCU 2 adopts the result of the speech recognition by the speech recognition apparatus 6 of the DCU 2. At subsequent S70, the controller 9 of the DCU 2 determines whether or not the result of the speech recognition is a command of the navigation unit 3.

When the result of the speech recognition is not a command of the navigation unit 3, the process proceeds to S80 according to "NO" at S70. At S80, the command represented by the result of the speech recognition is executed. Thereafter, the process returns to S10 to wait for a next input of speech. When the result of the speech recognition is a command of the navigation unit 3, the process proceeds to S90 according to "YES" at S70. At S90, the command represented by the result of the speech recognition is executed. From then on, the speech recognition is performed by the navigation unit 3. In this case, the controller (master control subject) transitions from the DCU 2 to the navigation unit 3 and the navigation unit 3 performs various processes including speech recognition, destination setting, route retrieval, and route guidance. In other words, from then on, until the navigation unit 3 ends operations, the DCU 2 is used as the HMI (i.e., the navigation unit 3 acts as the master control subject and the DCU 2 acts as the salve control subject).

When the result of the speech recognition by the speech recognition apparatus 6 of the DCU 2 is not a hierarchy command, corresponding to NO at S40, the process proceeds to S50. At S50, the controller 9 of the DCU 2 receives the result of the speech recognition by the speech recognition apparatus 7 of the navigation unit 3 and compares with the result of the speech recognition by the speech recognition apparatus 7 of the navigation unit 3 with the result of the speech recognition by the speech recognition apparatus 6 of the DCU 2, thereby determining whether or not they represent the same 1-shot command (which corresponds to the speech having the command of the navigation unit 3 plus the data portion (data of addresses, facility name or the like)).

When the results of the speech recognition represent different 1-shot commands, corresponding to NO at S50, the process proceeds to S100. At S100, the command represented by the result of the speech recognition by the speech recognition apparatus 6 of the DCU 2 is executed and the speech recognition is performed by the navigation unit 3 from then on, like S90. Thereafter, the controller (master control subject) transitions from the DCU 2 to the navigation unit 3 and the navigation unit 3 performs various processes including speech recognition, destination setting, route retrieval, route guidance or the like. In this case, the navigation unit 3 operates in such a way that the navigation unit 3 uses the DCU 2 as the HMI.

When the results of the speech recognition represent the same 1-shot command, corresponding to YES at S50, the process proceeds to S110. At S110, the result of the speech recognition by the navigation unit 3 is adopted. Additionally, speech recognition is hereafter performed by the speech recognition apparatus 7 of the navigation unit 3. Thereafter, based on the adopted result of the speech recognition, the navigation unit 3 (the controller 19) operates to perform various processes including destination setting, route retrieval, route guidance or the like and perform speech recognition on an as-needed basis. In this case, the control subject (master control subject) transitions from the DCU 2 to the navigation unit 3 and the navigation unit 3 operates in such a mode that the navigation unit 3 uses the DCU 2 as the HMI. It is noted in the flow chart of FIG. 3 that S10 to S110 are performed by the DCU 2 (the controller 9) and that S210 and S220 are performed by the navigation unit 3 (controller 19).

Figure 4:
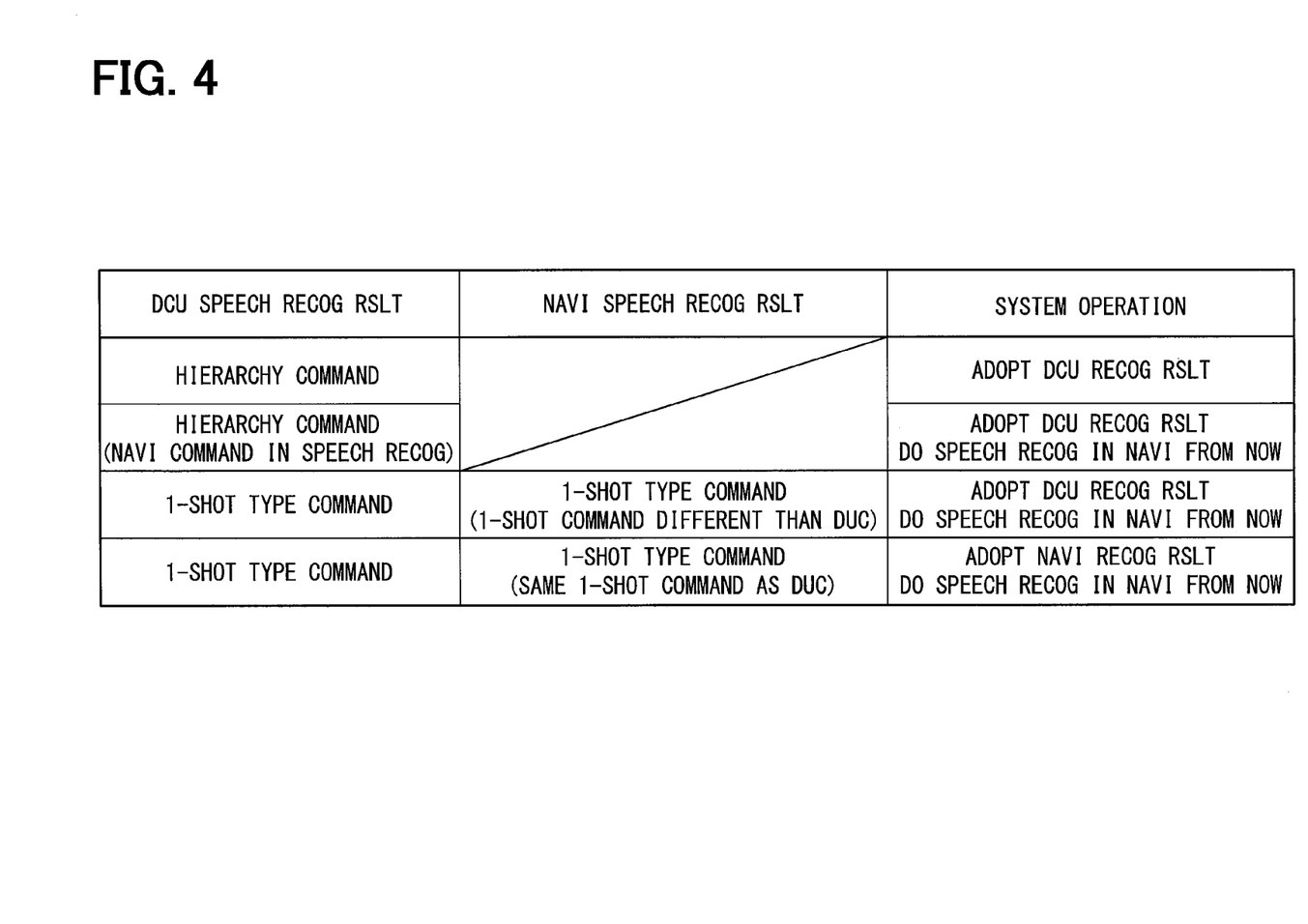
FIG. 4 is a diagram illustrating contents of speech recognition control.

The above-described speech recognition control of the speech recognition system 8 (the DCU 2 and the navigation unit 3) is summarized as FIG. 4.

In addition to the above-described speech recognition function, master control function and salve control function, the DCU 2 of the present embodiment has the following functions. The DCU 2 has a function of speech recognition of all the commands of the DCU 2, all the commands of the navigation unit 3, all the commands of the audio unit 4, and all the commands of the telephone communication unit 5. The DCU 2 has a function of determining whether the command recognized by the speech recognition is a command to be recognized by the DCU 2 or a command to be recognized by the navigation unit 3. The DCU 2 further has a speech output function for outputting talkback speeches, speech recognition guidance speeches, route guidance speeches, beep sounds and the like via the speaker of the audio unit 4. The DCU 2 further has a function of adding and outputting contents of the music usage dictionary 16 and the telephone book usage dictionary 17 of the recognition dictionary 12, and a function of creating, adding and updating various dynamic dictionaries (e.g., Voice Tag dictionary, artist dictionary, album dictionary, playlist dictionary, title dictionary etc.).

The navigation unit 3 of the present embodiment has a speech recognition function for inputting all the commands for the navigation unit, destinations and the like. The navigation unit 3 has a function of transmitting data to the DCU2 for outputting talkback speeches, speech recognition guidance speeches, route guidance speeches and the like via the speaker of the audio unit 4. The navigation unit 3 further has a function of adding and outputting contents of the Address usage dictionary 22 and the POI usage dictionary 23 of the recognition dictionary 21, and a function of creating, adding and updating various dynamic dictionaries (e.g., address book dictionary etc.).

In the present embodiment, the DCU 2 and the navigation unit 3 include the speech recognition apparatuses 6 and 7, respectively. The speech recognition apparatus 7 of the navigation unit 3 handles the speech recognition of addresses, facility names and the like associated with the map data. The speech recognition apparatus 6 of the DCU 2 handles the speech recognition of various commands of each unit of the in-vehicle system 1, music names, telephone books and the like. Therefore, the two speech recognition apparatuses 6 and 7 share speech recognition tasks in one's respective realms of expertise. Therefore, speech recognition accuracy improves.

In the above embodiment, the two speech recognition apparatuses 6 and 7 are provided in the in-vehicle system 1. Alternatively, three or more speech recognition apparatuses may be provided in the in-vehicle system 1. In this case, three or more speech recognition apparatuses are controlled by being appropriately assigned their speech recognition areas, so that speech recognition apparatuses share speech recognition tasks in their respective realms of expertise.

Although embodiments and configurations according to the present disclosure have been illustrated, the embodiments and configurations of the present disclosure are not limited to the above-illustrated embodiments and configurations. Embodiments and configurations realized by appropriately combining technical elements disclosed in different embodiments and configurations also fall in the range of the embodiments and configurations according to the present disclosure.

The invention claimed is:

1. A vehicular speech recognition system comprising:
   a display control unit that is mounted to a vehicle and includes a speech recognition apparatus;
   a navigation unit that is mounted to the vehicle, is connected to the display control unit, and includes a speech recognition apparatus; and
   a speech recognition controller that, when speech recognition of an inputted speech is performed individually by the speech recognition apparatus of the display control unit and the speech recognition apparatus of the navigation unit, selects and adopts one result of the speech recognition from among a result of the speech recognition of the display control unit and a result of the speech recognition of the navigation unit based on contents of the result of the speech recognition of the display control unit and contents of the result of the speech recognition of the navigation unit, wherein:

the plurality of speech recognition apparatuses have different recognition dictionaries for the speech recognition, the recognition dictionaries have different command-recognition dictionaries for the speech recognition of commands, and when the result of the speech recognition by the speech recognition apparatus of the display control unit represents only a command, the speech recognition controller adopts the result of the speech recognition by the speech recognition apparatus of the display control unit.

2. The vehicular speech recognition system according to claim 1, wherein:

when the result of the speech recognition by the speech recognition apparatus of the display control unit represents a command of the navigation unit, the speech recognition controller controls the speech recognition so that the speech recognition is performed hereafter by the speech recognition apparatus of the navigation unit.

3. A vehicular speech recognition system comprising:

a display control unit that is mounted to a vehicle and includes a speech recognition apparatus;

a navigation unit that is mounted to the vehicle, is connected to the display control unit, and includes a speech recognition apparatus; and a speech recognition controller that, when speech recognition of an inputted speech is performed individually by the speech recognition apparatus of the display control unit and the speech recognition apparatus of the navigation unit, selects and adopts one result of the speech recognition from among a result of the speech recognition of the display control unit and a result of the speech recognition of the navigation unit based on contents of the result of the speech recognition of the display control unit and contents of the result of the speech recognition of the navigation unit, wherein:

the plurality of speech recognition apparatuses have different recognition dictionaries for the speech recognition, the recognition dictionaries have different command-recognition dictionaries for the speech recognition of commands, and when the result of the speech recognition by the speech recognition apparatus of the display control unit includes a command portion and a data portion and does not coincide with the result of the speech recognition by the speech recognition apparatus of the navigation unit, the speech recognition controller adopts the result of the speech recognition by the speech recognition apparatus of the display control unit and controls the speech recognition so that the speech recognition is performed hereafter by the speech recognition apparatus of the navigation unit.

4. A vehicular speech recognition system comprising:

a display control unit that is mounted to a vehicle and includes a speech recognition apparatus;

a navigation unit that is mounted to the vehicle, is connected to the display control unit, and includes a speech recognition apparatus; and a speech recognition controller that, when speech recognition of an inputted speech is performed individually by the speech recognition apparatus of the display control unit and the speech recognition apparatus of the navigation unit, selects and adopts one result of the speech recognition from among a result of the speech recognition of the display control unit and a result of the speech recognition of the navigation unit based on contents of the result of the speech recognition of the display control unit and contents of the result of the speech recognition of the navigation unit, wherein:

the plurality of speech recognition apparatuses have different recognition dictionaries for the speech recognition, the recognition dictionaries have different command-recognition dictionaries for the speech recognition of commands, and when the result of the speech recognition by the speech recognition apparatus of the display control unit includes a command portion and a data portion and coincides with the result of the speech recognition by the speech recognition apparatus of the navigation unit, the speech recognition controller adopts the result of the speech recognition by the speech recognition apparatus of the navigation unit and controls the speech recognition so that the speech recognition is performed hereafter by the speech recognition apparatus of the navigation unit.

5. A vehicular speech recognition system comprising:

a display control unit that is mounted to a vehicle and includes a speech recognition apparatus;

a navigation unit that is mounted to the vehicle, is connected to the display control unit, and includes a speech recognition apparatus; and a speech recognition controller that, when speech recognition of an inputted speech is performed individually by the speech recognition apparatus of the display control unit and the speech recognition apparatus of the navigation unit, selects and adopts one result of the speech recognition from among a result of the speech recognition of the display control unit and a result of the speech recognition of the navigation unit based on contents of the result of the speech recognition of the display control unit and contents of the result of the speech recognition of the navigation unit, wherein:

the plurality of speech recognition apparatuses have different recognition dictionaries for the speech recognition;

the recognition dictionaries have different command-recognition dictionaries for the speech recognition of commands;

in response to input of the speech, the speech recognition apparatus of the display control unit and the speech recognition apparatus of the navigation unit independently and simultaneously perform the speech recognition for recognizing the speech;

when the inputted speech is independently and simultaneously performed by the speech recognition apparatus of the display control unit and the speech recognition apparatus of the navigation unit, the speech recognition controller determines whether the result of the speech recognition of the display control unit represents only a command or includes a command portion and a data portion;

when determining that the result of the speech recognition of the display control unit represents only a command, the speech recognition controller determines whether or not the result of the speech recognition of the display control unit represents a command for commanding a specific operation of the navigation unit;

when determining that the result of the speech recognition of the display control unit represents the command for commanding the specific operation of the navigation unit, the speech recognition controller selects and adopts the result of the speech recognition of the display control unit and controls the speech recognition so that the speech recognition is performed hereafter by the speech recognition apparatus of the navigation unit;

when determining that the result of the speech recognition of the display control unit does not represent the command for commanding the specific operation of the navigation unit, the speech recognition controller selects and adopts the result of the speech recognition of the display control unit and controls the speech recognition so that the speech recognition is performed hereafter by the speech recognition apparatus of the display control unit;

when determining that the speech recognition of the display control unit includes the command portion and the data portion, the speech recognition controller determines whether or not the result of the speech recognition of the display control unit coincides with the result of the speech recognition of the navigation unit;

when the result of the speech recognition of the display control unit does not coincide with the result of the speech recognition of the navigation unit, the speech recognition controller adopts the result of the speech recognition of the display control unit- and controls the speech recognition so that the speech recognition is performed hereafter by the speech recognition apparatus of the navigation unit; and when the result of the speech recognition of the display control unit coincides with the result of the speech recognition of the navigation unit, the speech recognition controller adopts the result of the speech recognition of the navigation unit and controls the speech recognition so that the speech recognition is performed hereafter by the speech recognition apparatus of the navigation unit.

* * * * *